United States Patent

Normann

[11] Patent Number: 6,017,179
[45] Date of Patent: Jan. 25, 2000

[54] RING CONVEYOR

[75] Inventor: Klaus Dieter Normann, Schmiden, Germany

[73] Assignee: Seeger GmbH, Pluederhausen, Germany

[21] Appl. No.: 08/860,347

[22] PCT Filed: Jan. 25, 1996

[86] PCT No.: PCT/EP96/00292

§ 371 Date: Aug. 27, 1997

§ 102(e) Date: Aug. 27, 1997

[87] PCT Pub. No.: WO96/31421

PCT Pub. Date: Oct. 10, 1996

[30] Foreign Application Priority Data

Apr. 7, 1995 [DE] Germany .......................... 195 13 137

[51] Int. Cl.$^7$ .................................................. B65G 25/00
[52] U.S. Cl. ......................... 414/175; 414/213; 414/301; 414/326; 198/536; 198/803.16
[58] Field of Search ..................... 198/535, 536, 198/540, 587, 588, 611, 803.16; 414/172–175, 209–211, 213, 216, 301, 326; 110/275; 432/239

[56] References Cited

U.S. PATENT DOCUMENTS

| 2,297,289 | 9/1942 | Collis et al. | 414/213 |
| 3,900,117 | 8/1975 | Tuovinien et al. | 414/172 |
| 3,964,892 | 6/1976 | Schumacher et al. | 414/301 |
| 4,442,782 | 4/1984 | Lilley et al. | 414/173 |

FOREIGN PATENT DOCUMENTS

3204924 C2  9/1984  Germany .

Primary Examiner—Jospeh E. Valenza
Attorney, Agent, or Firm—Flynn, Thiel, Boutell & Tanis, P.C.

[57] ABSTRACT

The invention relates to a ring conveyor for conveying bulk material, especially brewing barley or long malt, from a feed pipe fitted permanently inside a building in the form of an annular tower and opening above the ring conveyor into the region of a radial charging and discharging machine circulating above a kiln floor. The ring conveyor has a circular base and a closed rotary ring, open-edged at its outer periphery, arranged coaxially with the floor and with a substantially vertically adjoining inner wall at its inner periphery. There is also a doctor blade firmly secured to the charging and discharging machine, engaging in the rotary ring and diverting the bulk material to the charging and discharging machine. The rotary ring turns at a higher cycle frequency than the charging and discharging machine.

16 Claims, 4 Drawing Sheets

RING CONVEYOR

FIELD OF THE INVENTION

The invention relates to a ring conveyor for conveying bulk material, especially brewing barley or long malt, from a feed pipe disposed stationary inside an annular tower and opening above the ring conveyor into the region of a radial charging and discharging machine circulating above a kiln floor.

BACKGROUND OF THE INVENTION

Ring conveyors of the type described above are especially suited for use in malting towers. In such facilities the barley as a raw material is first soaked in soaking tanks and then transferred to so-called germinating boxes. After having spent a certain time in the germinating boxes, the soaked barley germinates and thereby turns into long malt. In the next process step, the long malt is transferred to the drying kiln and dried to kiln malt. In order to use the available space economically, a number of germinating boxes is usually positioned one on top of another, wherein the one or more soaking tanks are positioned above and the drying kiln below the germinating boxes. The soaked barley is gravity fed by means of a downpipe which is positioned in the center of the annular tower, from which downpipe the individual germinating boxes are filled by means of a system of diverting flaps and feed pipes. A charging and discharging machine is disposed in each germinating box, to which charging and discharging machine the soaked barley is supplied via the feed pipe. The charging and discharging machine slowly rotates above the kiln floor and distributes the total supply amount in the course of one rotation. The discharging of the germinating box is performed in a similar manner, wherein the germinated soaked material, the so-called long malt, is then supplied to the downpipe through a discharge pipe which is disposed in the lower region of the germinating box, through which downpipe it reaches the drying kiln.

A ring conveyor of the type described above is known from DE-A 32 04 924. This ring conveyor has a trough-shaped floor, which is connected to the charging and discharging machine and which has a discharge opening positioned above the charging and discharging machine. In the trough-shaped ring floor a carrier ring consisting of two concentric ring walls and radial separation walls which form individual chambers rotates in a contactless manner. The rotational frequency of the carrier ring is substantially higher than that of the ring floor and the charging and discharging machine, respectively. The soaked material falling from above into the chambers is conveyed over the circumference, until it reaches the discharge opening and falls through this into the region of the charging and discharging machine. Due to the relative movement between the chambers and the ring floor, frictional and shear forces occur along the whole conveying distance, which can lead to a damage of the sensitive soaked material.

SUMMARY OF THE INVENTION

Based on this it is the object of the invention to further develop a ring conveyor of the type described above, such that the material coming from the feed pipe is conveyed as gently as possible.

According to the present invention, this object is attained in that the ring conveyor comprises a rotary ring which is open-edged at its outer periphery and which has an annular base and an endless inner wall which is disposed coaxially with respect to the annular base and joins the inner circumference of the annular base generally vertically, and that there is provided a doctor blade which is connected to the charging and discharging machine, which engages into the rotary ring, and which diverts the bulk material to the charging and discharging machine, and that the rotary ring rotates at a higher cycle frequency than the charging and discharging machine.

The soaked material reaches the rotary ring by way of the feed pipe, which rotary ring transports the material without the influence of damaging frictional or shearing forces into the region of the charging and discharging machine, where the doctor blade diverts the material to the charging and discharging machine. Since the transport capacity of the rotary ring is limited, the rotary ring has to rotate with a substantially higher frequency than the charging and discharging machine, since the material would otherwise fall over the open edge. The frequency of rotation of the rotary ring should, on the other hand, be not too high, since the centrifugal force acting on the material would otherwise also carry the material outward over the open edge. The frequency of rotation of the rotary ring is to be set such that these boundary conditions are taken into account.

In order to reduce the influence of the centrifugal forces and to thereby increase the transport capacity of the rotary ring, the annular base may be formed to slope radially outwards in an ascending manner.

In a preferred embodiment there is provided a driving device for the rotary ring, which driving device comprises a drive motor, a pin wheel gear which is connected to the annular base, and a sprocket which is disposed on a drive shaft of the drive motor. In this, the pin wheel gear has an upper and a lower ring plate, inbetween which plates bolts spaced corresponding to the tooth spacing of the sprocket are welded. A driving device of this type has the advantage of having a compact construction and a low susceptibility to failure. The driving motor is preferably operated electrically.

In order to ensure a quiet operation of the rotary ring, this should be centered and supported radially and axially by means of support rollers or sliding members. Preferably, the axial supporting members are disposed at the lower ring plate of the pin wheel gear and are themselves supported by a support ring which is disposed fixed to the building, and the radial support members are disposed at the inner side of the pin wheel gear and are supported by a centering ring which is disposed fixed to the building. It is also possible, though, that the supporting members are disposed fixed to the building and then support themselves on the lower ring plate of the pin wheel gear or a radial support ring which is disposed on the inner side of the pin wheel gear. In both cases there should be provided at least three support rollers or sliding members each, which are disposed regularly spaced over the circumference of the rotary ring.

In a further embodiment of the invention, the rotary ring may be driven also by chain or friction drive means instead of by a pin wheel gear and a sprocket.

In a further embodiment of the invention, the doctor blade is disposed directing outwardly at an angle and extending outwardly toward a chute or pipe which opens above the charging and discharging machine. This ensures a safe diversion of the soaked material to the charging and discharging machine.

In order to evenly distribute the soaked material in the germinating box, the charging and discharging machine has a screw conveyor extending horizontally and circulation screws positioned vertically.

An especially compact construction is attained, when the drive motor of the rotary ring is disposed on a frame of the charging and discharging machine.

The rotary ring and the charging and discharging machine rotate in opposite directions.

The device for unloading the germinating box is designed essentially analogous to the loading device. To this end, the ring conveyor comprises a rotary ring which is open-edged at its inner circumference, which is disposed below the kiln floor, and which has an annular ring floor and an endless outer wall which is disposed coaxially with respect to the ring floor and which joins the outer circumference of the ring floor generally vertically, and further comprises a doctor blade which is disposed fixed to the building in the region of a discharge pipe and which extends into the rotary ring and diverts the bulk material into the discharge pipe, the rotary ring rotating at a higher cycle frequency than the charging and discharging machine.

The bulk material is supplied to the rotary ring which is disposed below the kiln floor by means of a discharge opening which is provided in a discharge cylinder which is connected to the charging and discharging machine and rotates together with this and which is formed by a discharge flap and is positioned in the region of the radially inner end of a charging and discharging screw of the charging and discharging machine. It goes without saying that the discharge flap remains closed during the loading of the germinating box and is opened only at the beginning of the discharging process.

In order to ensure a complete unloading of the germinating box, the lower edge of the discharge opening should be disposed flush with respect to the kiln floor.

BRIEF DESCRIPTION OF THE DRAWINGS

In the following the invention is further described with reference to the embodiments shown in the drawing, in which.

DETAILED DESCRIPTION

Figure 1:
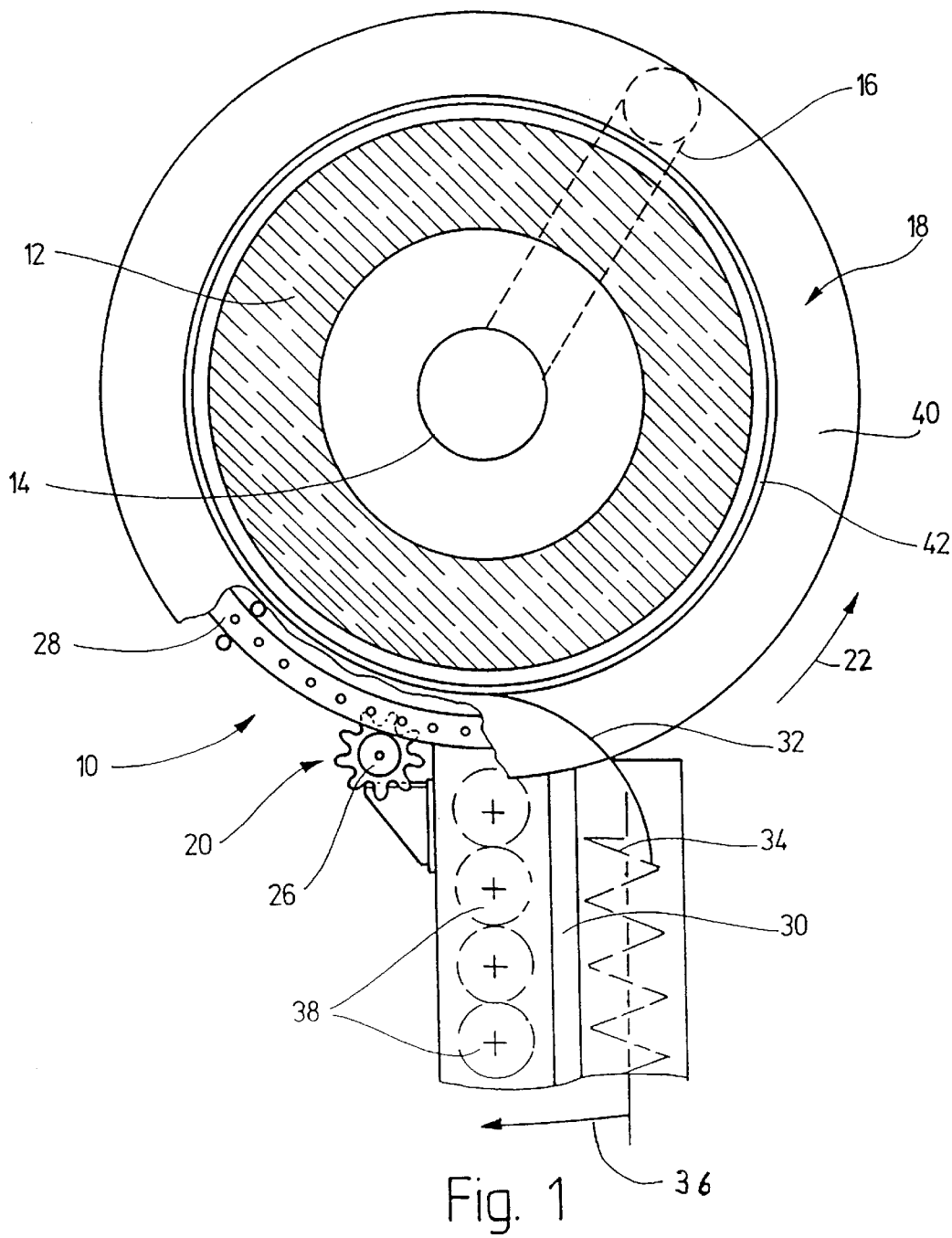
FIG. 1 shows a partially sectioned top view of a ring conveyor.

The ring conveyor 10 shown in the drawing is positioned concentrically with respect to the center column 12 of a malting plant in the form of an annular tower. Bulk material reaches the rotary ring 18 of the ring conveyor 10 by means of a downpipe 14 which is disposed within the center column and by means of a feed pipe 16 which penetrates the center column 12. The rotary ring 18 is driven in the direction of the arrow 22 by means of a driving device 20, which comprises a drive motor 24 (FIGS. 2 and 3), a sprocket 26, and a pin wheel gear 28. The bulk material which reaches the rotary ring 18 through the feed pipe 16 circulates together with the rotary ring, until it reaches the region of a doctor blade 32 which is disposed fixed to a charging and discharging machine 30. The doctor blade 32 diverts the bulk material from the rotary ring 18 radially outwards, so that it falls into into the radially inner region of a charging and discharging screw 34 of the charging and discharging machine 30. The charging and discharging screw 34 rotates during the charging of the germinating box such that the bulk material is carried radially outwards and is distributed evenly over the kiln floor of the germinating box. The charging and discharging machine 30 slowly circulates in the direction of the arrow 36, which is opposite to the sense of rotation of the rotary ring 18, above the kiln floor, wherein the period of circulation of one to two hours is set such that the germinating box is charged or discharged during a single circulation of the charging and discharging machine 30. The charging and discharging machine 30 has, as seen in the direction of circulation, a plurality of circulation screws 38 following the charging and discharging screw, which ensure an even distribution and loosening of the bulk material.

The rotary ring 18 and its manner of support are now described in greater detail with reference to FIGS. 2 and 3. The rotary ring 18 has an annular horizontal (FIG. 2) or radially outwardly ascending (FIG. 3) base 40 and an inner wall 42 disposed coaxially with respect to the base 40 and joining the base vertically at its inner circumference. The pin wheel gear 28 is fixed to the underside of the rotary ring 18 in the region of its inner circumference, which pin wheel gear has upper and lower ring plates 44, 46 as well as bolts 48 which are welded inbetween the ring plates spaced corresponding to the tooth spacing of the sprocket 26. The pin wheel gear 28 not only carries the rotary ring 18 and enables its drive, but serves at the same time for its support and centering with respect to the center column 12 of the annular tower. To this end, axial and radial support members in the form of support rollers (FIG. 2) or sliding members (FIG. 3) are provided.

Figure 2:
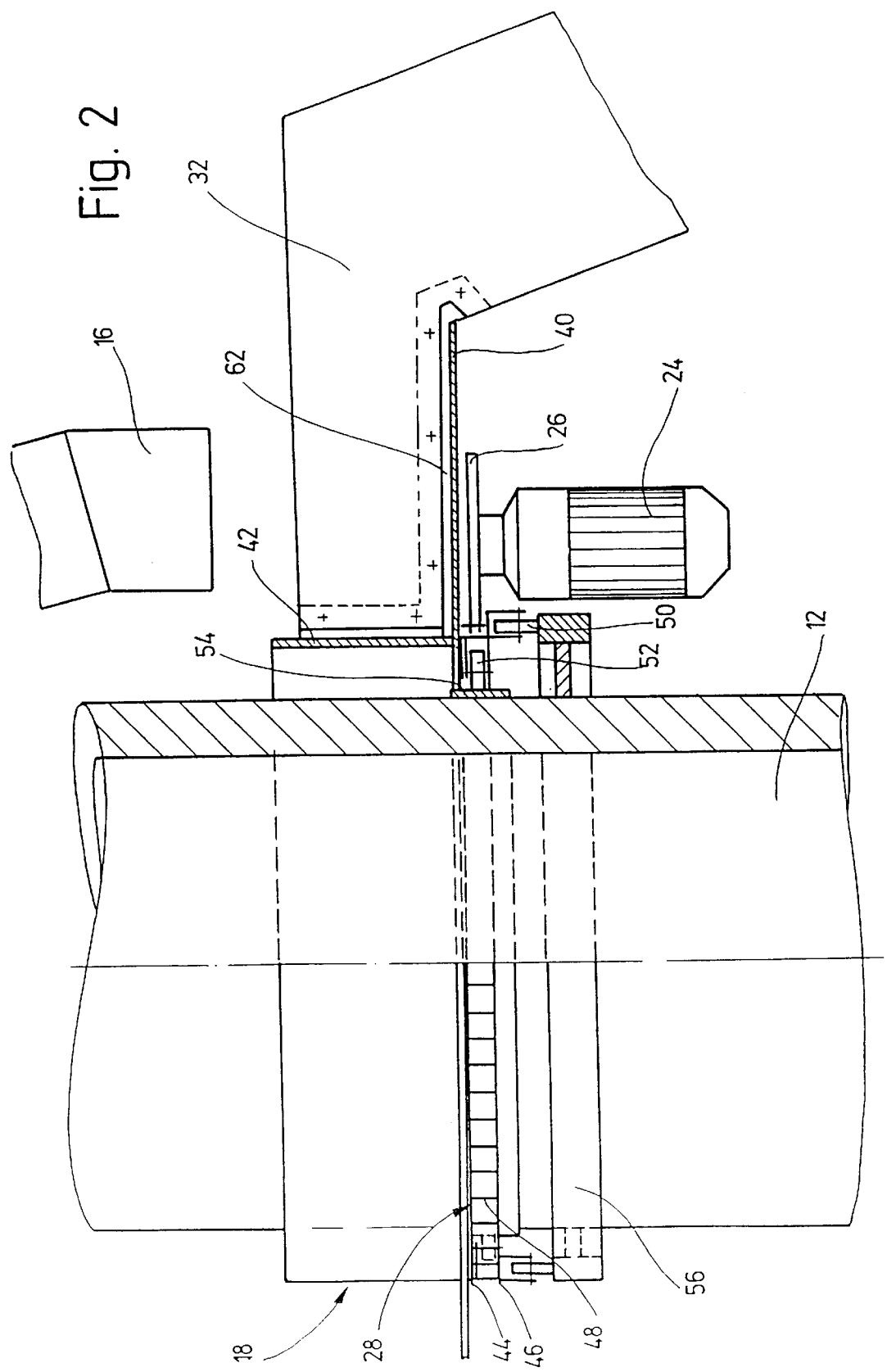
FIG. 2 shows a partially sectioned side view of a ring conveyor having a horizontal ring floor.
Figure 3:
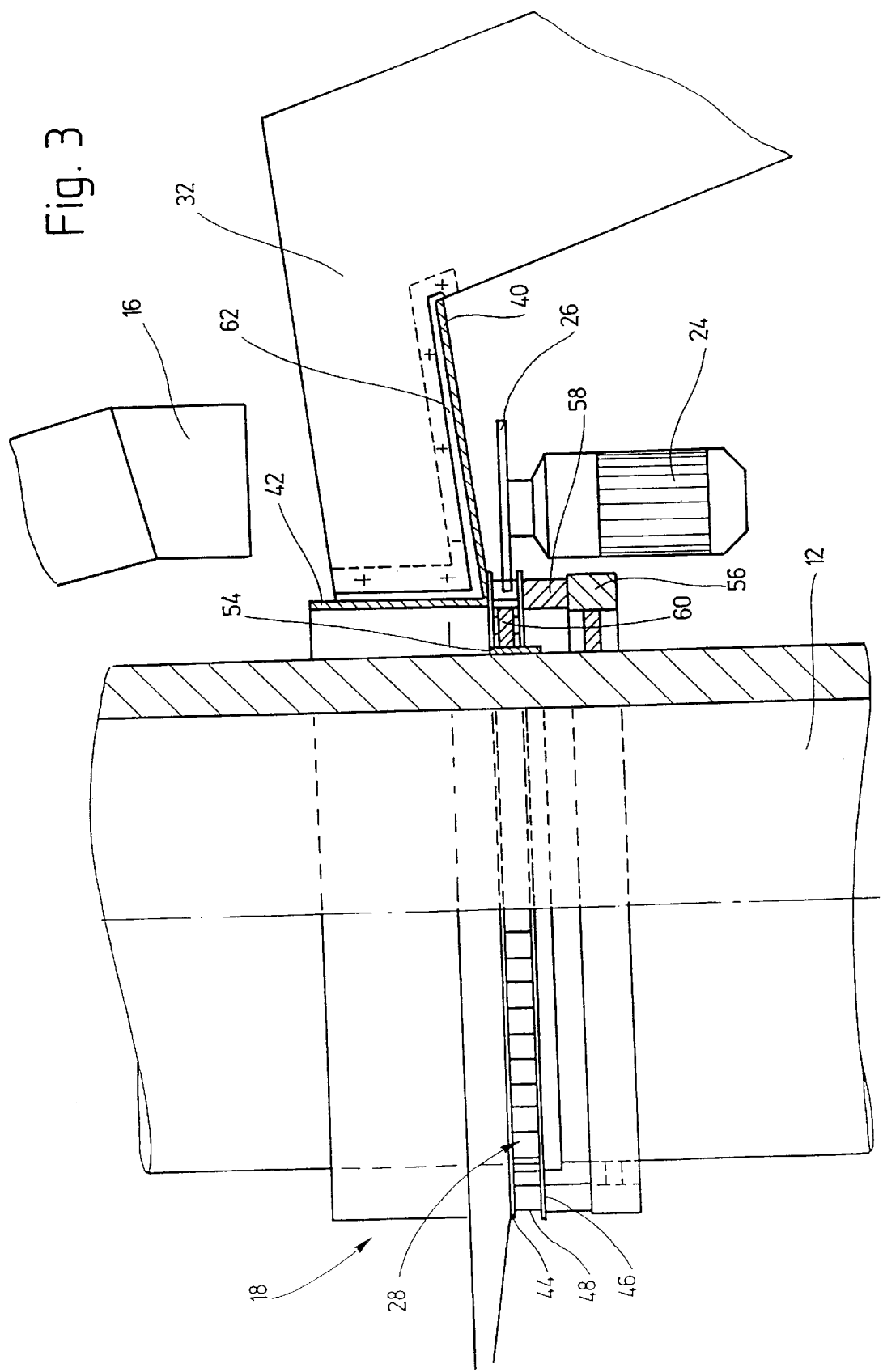
FIG. 3 shows a partially sectioned side view of a ring conveyor having a sloped ring floor.

In the embodiment of FIG. 2 the rotary ring 18 is supported axially and radially by means of support rollers 50, 52, wherein the radial support rollers 52 are positioned at the inner side of the pin wheel gear 28 and the axial support rollers 50 are positioned at the underside of the lower ring plate 46 of the pin wheel gear 28. The radial support rollers 52 run on the outer surface of a centering ring 54 which surrounds the center column 12, and the axial support rollers 50 run on the upper side of a support ring 56 which is disposed concentrically with respect to the center column 12. The rotary ring 18 of the embodiment shown in FIG. 3 is supported and centered in a similar manner by axial and radial sliding members 58, 60. In order to ensure a quiet operation, at least three axial and radial support rollers 50, 52 or sliding members 58, 60 each are distributed evenly over the circumference of the rotary ring.

The doctor blade 32 which diverts the bulk material from the rotary ring 18 to the charging and discharging machine 30 may, as shown in FIG. 1, be designed to be curved or straight, but should in any case be positioned such that it is directed slanted outwardly as seen in the direction of rotation of the rotary ring. The doctor blade 32 may furthermore extend outwardly toward a chute or pipe (not shown), which opens above the radially inner region of the charging and discharging screw 34. The edges of the doctor blade 32 adjacent to the ring floor and the inner wall are fitted with an elastic sealing member 62, for instance a rubber blade, in order to divert the bulk material without wear and excessive noise, but such that the doctor blade still lies against the ring floor 40 and the inner wall 42 of the rotary ring 18.

Figure 4:
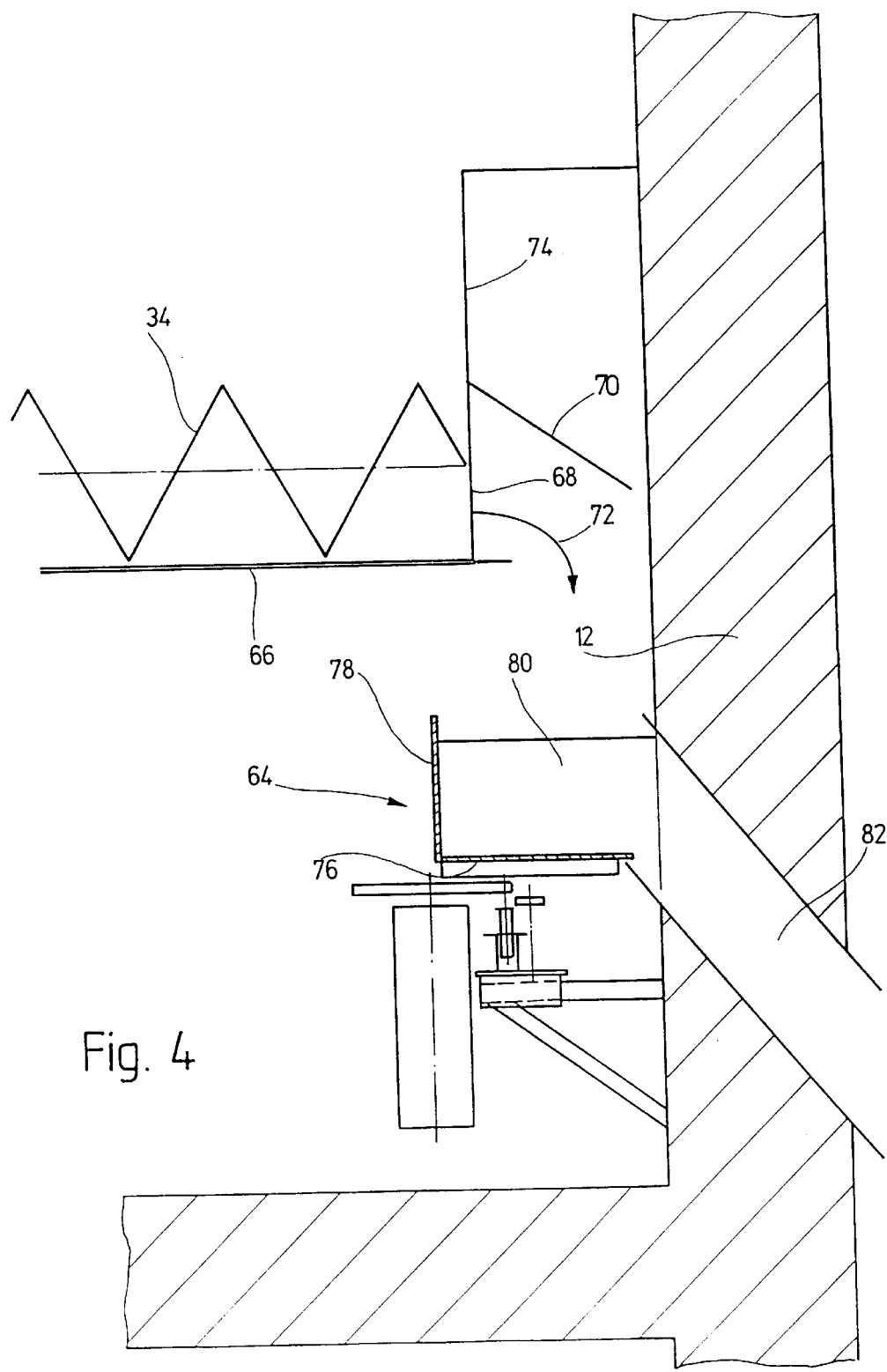
FIG. 4 shows a sectional side view of a discharging rotary ring.

A further rotary ring 64 is positioned in a region below the kiln floor 66 for discharging the germinating box (FIG. 4). During the discharging of the germinating box the bulk material is transported radially inwards by means of the charging and discharging screw 34 and reaches the further rotary ring 64 according to the arrow 72 through a discharge flap which gives free a discharge opening 68 during the discharging. The discharge flap 70 is part of a discharge cylinder 74 which is connected fixed to the charging and discharging machine 30 and rotates together with this, the discharge cylinder 74 delimiting the germinating box radially inwardly.

The further rotary ring 64 is constructed similarly to the charging rotary ring 18 with respect to its drive and support, so that reference may be made to the description of the charging rotary ring 18, with the difference that the rotary ring 64 is open-edged in its radially inner region and that it has an outer wall 78 joining the ring floor 76 radially outwards. The bulk material is diverted into the discharge pipe 82 which penetrates the center column by means of a doctor blade 80 which extends into the rotary ring 74 and is disposed fixed to the center column 12, and is supplied to the downpipe 14. The bulk material is then transferred to the drying kiln for further treatment by means of a further conveyor which is disposed in the lower region of the annular tower.

In summary, the following is to be stated: The ring conveyor 10 serves to convey bulk material, especially brewing barley or long malt, from a feed pipe 16 disposed stationary inside an annular tower and opening above the ring conveyor 10 into the region of a radial charging and discharging machine 30 circulating above a kiln floor. The ring conveyor 10 comprises a rotary ring 18 which is open-edged at its outer periphery and which has an annular base 40 and an endless inner wall 42 which is disposed coaxially with respect to the annular base 40 and joins the inner circumference of the annular base generally vertically. Further, there is provided a doctor blade 32 which is connected to the charging and discharging machine 30, which engages into the rotary ring 18, and which diverts the bulk material to the charging and discharging machine 30. The rotary ring 18 rotates at a higher cycle frequency than the charging and discharging machine 30.

The embodiments of the invention in which an exclusive property or privilege is claimed are defined as follows:

1. A ring conveyor for conveying bulk material, especially brewing barley or long malt, from a feed pipe (16) disposed stationary inside a building in the form of an annular tower and opening above the ring conveyor (10) into the region of a radial charging and discharging machine (30) circulating above a kiln floor (66), wherein the ring conveyor (10) comprises a rotary ring (18) which is open-edged at its outer periphery and which has an annular base (40) and an endless inner wall (42) which is disposed coaxially with respect to the annular base (40) and joins the inner circumference of the annular base generally vertically, wherein there is provided a doctor blade (32) which is connected to the charging and discharging machine (30), which engages into the rotary ring (18), and which diverts the bulk material to the charging and discharging machine (30), and wherein the rotary ring (18) rotates at a higher cycle frequency than the charging and discharging machine (30).

2. The ring conveyor of claim 1, wherein the annular base (40) is formed to slope radially outwards.

3. The ring conveyor of claim 1, wherein there is provided a driving device for the rotary ring (18), which driving device comprises a drive motor (24), a pin wheel gear (28) which is connected to the annular base (40), and a sprocket (26) which is disposed on a drive shaft of the drive motor (24).

4. The ring conveyor of claim 3, wherein the pin wheel gear (28) has an upper and a lower ring plate (44,46), inbetween which plates bolts (48) spaced corresponding to the tooth spacing of the sprocket (26) are welded.

5. The ring conveyor of claim 1, wherein the rotary ring (18) is centered and supported axially and radially by means of support rollers (50,52) or sliding members (58,60).

6. The ring conveyor of claim 5, wherein the axial support members (50,58) are disposed at the lower ring plate (46) of the pin wheel gear (28) and are themselves supported by a support ring (56) which is disposed fixed to the building, and wherein the radial support members (52,60) are disposed at the inner side of the pin wheel gear (28) and are supported by a centering ring (54) which is disposed fixed to the building.

7. The ring conveyor of claim 5, wherein there are provided at least three support rollers (50,52) or sliding members (58,60) each, which are disposed regularly spaced over the circumference of the rotary ring (18).

8. The ring conveyor of claim 1, wherein the rotary ring (18) is driven by chain or friction drive means.

9. The ring conveyor of claim 1, wherein the doctor blade (32) is disposed directing outwardly at an angle and extending outwardly toward a chute or pipe which opens above the charging and discharging machine (30).

10. The ring conveyor of claim 1, wherein the charging and discharging machine (30) comprises a screw conveyor (34) extending horizontally and circulation screws (38) positioned vertically.

11. The ring conveyor of claim 3, wherein the drive motor (24) of the rotary ring (18) is disposed on a frame of the charging and discharging machine (30).

12. The ring conveyor of claim 1, wherein the rotary ring (18) and the charging and discharging machine (30) rotate in opposite directions.

13. The ring conveyor of claim 1, comprising a rotary ring (64) which is open-edged at its inner circumference, which is disposed below the kiln floor (66), and which has an annular ring floor (76) and an endless outer wall (78) which is disposed coaxially with respect to the ring floor and which joins the outer circumference of the ring floor generally vertically, and comprising a doctor blade (80) which is disposed fixed to the building in the region of a discharge pipe (82) and which extends into the rotary ring (64) and diverts the bulk material into the discharge pipe (82), the rotary ring rotating at a higher cycle frequency than the charging and discharging machine (30).

14. A ring conveyor for conveying bulk material, especially brewing barley or long malt, from a charging and discharging machine (30), which circulates above a kiln floor (66) of a building in the form of an annular tower and which supplies the bulk material to the ring conveyor, to the vicinity of a discharge pipe (82) which opens into a downpipe (14) disposed in the center of the tower, comprising a rotary ring (64) which is open-edged at its inner circumference, which is disposed below the kiln floor (66), and which has an annular ring floor (76) and an endless outer wall (78) which is disposed coaxially with respect to the ring floor and which joins the outer circumference of the ring floor generally vertically, and comprising a doctor blade (80) which is disposed fixed to the building in the region of a discharge pipe (82) and which extends into the rotary ring (64) and diverts the bulk material into the discharge pipe (82), the rotary ring rotating at a higher cycle frequency than the charging and discharging machine (30).

15. The ring conveyor of claim 14, wherein the bulk material is supplied to the rotary ring (64) which is disposed below the kiln floor (66) by means of a discharge opening (68) which is provided in a discharge cylinder (74) which is connected to the charging and discharging machine (30) and rotates together with this and which is formed by a discharge flap (70) and is positioned in the region of the radially inner end of a charging and discharging screw (34) of the charging and discharging machine (30).

16. The ring conveyor of claim 15, wherein the lower edge of the discharge opening (68) is disposed flush with respect to the kiln floor (66).

* * * * *